United States Patent [19]

Brownstein

[11] Patent Number: 4,691,211
[45] Date of Patent: Sep. 1, 1987

[54] THERMAL PRINTER

[75] Inventor: Scott A. Brownstein, Rochester, N.Y.

[73] Assignee: Eastman Kodak Company, Rochester, N.Y.

[21] Appl. No.: 843,411

[22] Filed: Mar. 24, 1986

[51] Int. Cl.$^4$ ....................... G01D 15/10; H04N 1/21; B41J 3/20
[52] U.S. Cl. ............................... 346/76 PH; 400/120; 358/298
[58] Field of Search .......................... 346/1.1, 76 PH; 400/120; 358/298

[56] References Cited

U.S. PATENT DOCUMENTS

| 4,496,955 | 1/1985 | Maeyama et al. | 346/76 PH |
| 4,532,523 | 7/1985 | Tanaka | 346/76 PH |
| 4,558,328 | 12/1985 | Takanashi et al. | 346/76 PH |
| 4,563,693 | 1/1986 | Masaki | 346/76 PH |

Primary Examiner—E. A. Goldberg
Assistant Examiner—Gerald E. Preston
Attorney, Agent, or Firm—Raymond L. Owens

[57] ABSTRACT

Adjacent heating elements are energized during different time slots of an address cycle to produce dye portions in adjacent image pixels which are staggered. The area of the dye portion being proportional to image pixel density.

1 Claim, 9 Drawing Figures

THERMAL PRINTER

CROSS REFERENCE TO RELATED APPLICATION

Commonly assigned U.S. patent application Ser. No. 778,960, filed Sept. 23, 1985 entitled "Apparatus and Method for Controlling Thermal Printer Apparatus" to Brownstein.

BACKGROUND OF THE INVENTION

1. Field of the Invention

The present invention relates to thermal printers wherein the selective energization of heating elements causes the transfer of dye to a receiver member.

2. Description of the Prior Art

In a thermal printer which uses a dye transfer process, a carrier containing dye is disposed between a receiver, such as paper, and a print head assembly formed of, for example, a plurality of individual thermal elements often referred to as heating elements. The receiver and carrier are generally moved relative to the print head which is fixed. When a particular heating element is energized, it is heated and causes dye to transfer (e.g. by sublimation) from the carrier to an image pixel in the receiver. The density, or darkness, of the printed dye is a function of the temperature of the heating element and the time the carrier is heated. In other words the energy delivered from the heating element to the carrier causes dye to transfer to an image pixel of a receiver. The amount of dye is directly related to the amount of heat transferred to the carrier.

Thermal dye transfer printers offer the advantage of true "continuous tone" dye density transfer. This result is obtained by varying the energy applied by each heating element to the carrier, yielding a variable dye density image pixel in the receiver.

A conventional method of energizing heating elements employs a pulse width modulation scheme as will now be explained. A print head is organized into a plurality of groups of heating elements. The heating elements in each group are simultaneously addressed in parallel. In this disclosure when the term addressed is used, it means that an element is capable of being energized. Each group is addressed sequentially one at a time. The reason groups are used is that if all the heating elements were energized at the same time, a large and more expensive power supply would be needed. For example, if a heating element were to draw 68 milamperes and 512 heating elements were used, the power supply would, if all heating elements were energized, have to produce 33.3 amperes. A very expensive power supply would have to be provided to produce this amount of current. Therefore, the group arrangement is preferred.

When a group of heating elements are addressed during an address cycle, individual elements of the group can be selectively energized. The heating elements, when energized, are driven with a constant current. FIG. 1a shows a prior art pulse width modulation scheme used to drive a heating element. As noted above, the amount of dye transferred to an image pixel of a receiver depends upon the energy (heat) transferred to the carrier. Since the receiver moves relative to the print head image pixels are longer than their corresponding heating elements. During the address cycle, the maximum time a current pulse can be provided to a heating element is $(t_1 - t_0)$. This will produce the maximum density dye image pixel. Image pixel #1 in FIG. 1b is formed by this process. If the pulse width is made smaller $(t_b - t_0)$, then a less dense image pixel will be formed. See image pixed #2 in FIG. 1b. Thermal pixels are selectively turned off at the variable time $t_b$ depending on the desired dye density of the image pixel. If a still smaller pulse width $(t_a - t_0)$ is used then an even lower dye density image pixel will be formed. See image pixel #3 in FIG. 1b. During the time dye image pixels are being formed, both the dye carrier and receiver are moved relative to the heating element print head. The reason for this is that a stationary carrier can stick or bond to the heated heating elements. If a thermal pixel is energized for a time less than $(t_a - t_0)$, then on an image pixel such as shown image pixel #4 of FIG. 1b will be formed. For illustrative purposes, the size of a heating element (stippled portion) which produces these image pixels is shown next to image pixel #4.

FIG. 1b shows the first line of four image pixels formed by the above described system. The area of the dye portion of an image pixel is proportional to the image pixel dye density. At the beginning of an address cycle ($t_o$ FIG. 1a) all the heating elements of a group are generally energized. The energization of each heating element of a group starts at the time $t_o$ (START OF LINE). At this time $t_o$, the heating elements of a group create a peak current demand. Thus, even with using groups of heating elements, problems still remain with drawing too much current at the start of an address cycle.

Although the image pixels of FIG. 1b are shown as having dye portions (stippled) and undyed portions (white), the undyed portions may have some dye due to the thermal time constant of the heating elements. In other words, after a heating element has been de-energized it may still provide enough heat to cause some dye to transfer to an image pixel.

SUMMARY OF THE INVENTION

It is an object of this invention to provide a thermal printer which reduces the current drawn by the heating elements during a typical address cycle.

It has been found that this object can be accomplished by staggering the dye portion of adjacent image pixels. See FIG. 7. To accomplish this staggering, some heating elements are energized at the start of a line and others later in the address cycle. By means of this arrangement, the total current demands of the heating elements of a group can at any given time be reduced on average. In other words, the current demand is equalized over the entire address cycle, and a smaller power supply can be used. The only time this process will not decrease peak current provided by a power supply is in the event most of the image pixels are to be at maximum density. A smaller power supply will provide less current than need and image quality will suffer. However, this event is unlikely and the benefits of a smaller lower cost power supply far outweigh this possibility.

Thermal printing apparatus in accordance with the invention transfers dye to form a dye image in a receiver composed of a plurality of lines of dye image pixels. Each dye image pixel has a predetermined number of possible dye density levels with the area of the dye portion of an image pixel being proportional to image pixel density. The apparatus comprises:

(a) a thermal print head including heating elements which are selectively energizable during an address cycle for image pixels of a line, an energized heating element causing dye to transfer to an image pixel in the receiver;

(b) means for providing relative movement between the receiver and print head during an address cycle; and (c) control means for energizing at least two adjacent heating elements during different time sequences of an address cycle to cause adjacent image pixels to be formed in which their dye portions are staggered.

By alternating image pixels of a line, the overall quality of an image as determined by an observer can be improved.

BRIEF DESCRIPTION OF THE DRAWINGS

FIG. 1b illustrates a partial view of prior art dye image pixels in a receiver formed by the scheme of FIG. 1a;

DESCRIPTION OF THE PREFERRED EMBODIMENT

Figure 1A:
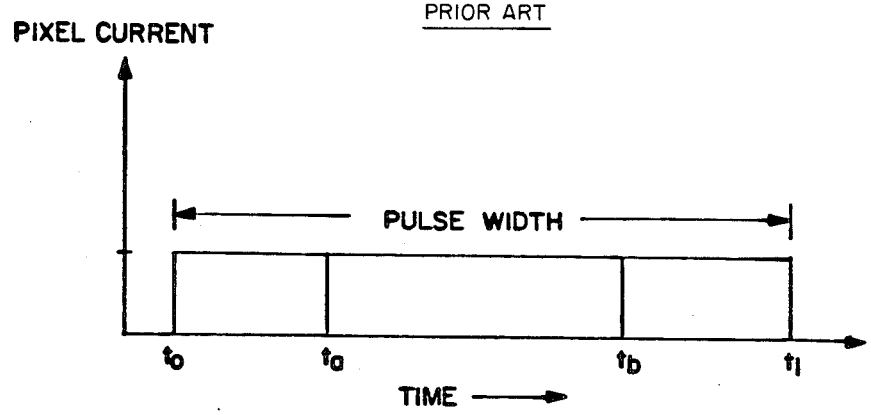
FIG. 1a illustrates a pulse width modulation scheme used in prior art thermal printers.
Figure 1B:
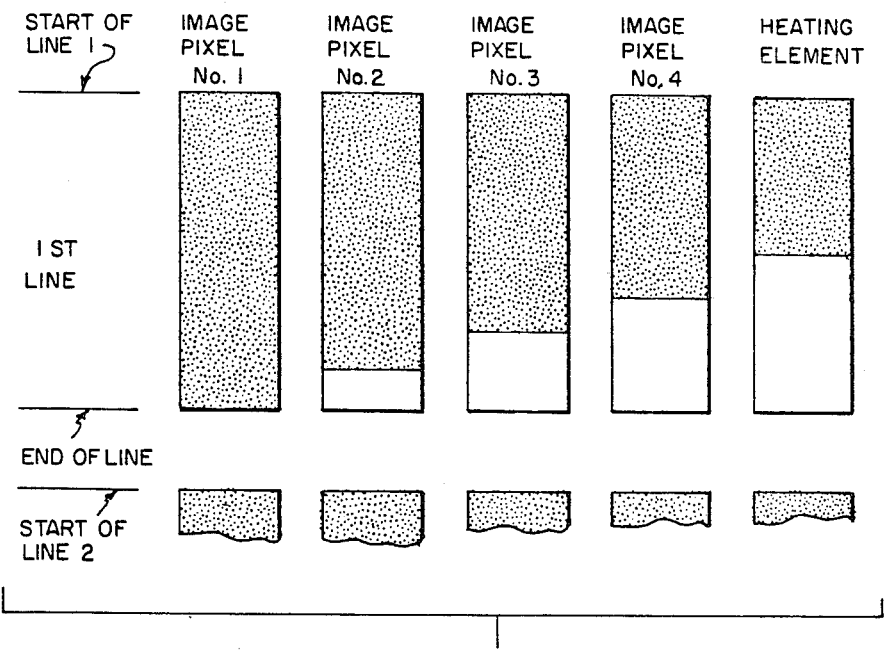
Figure 2:
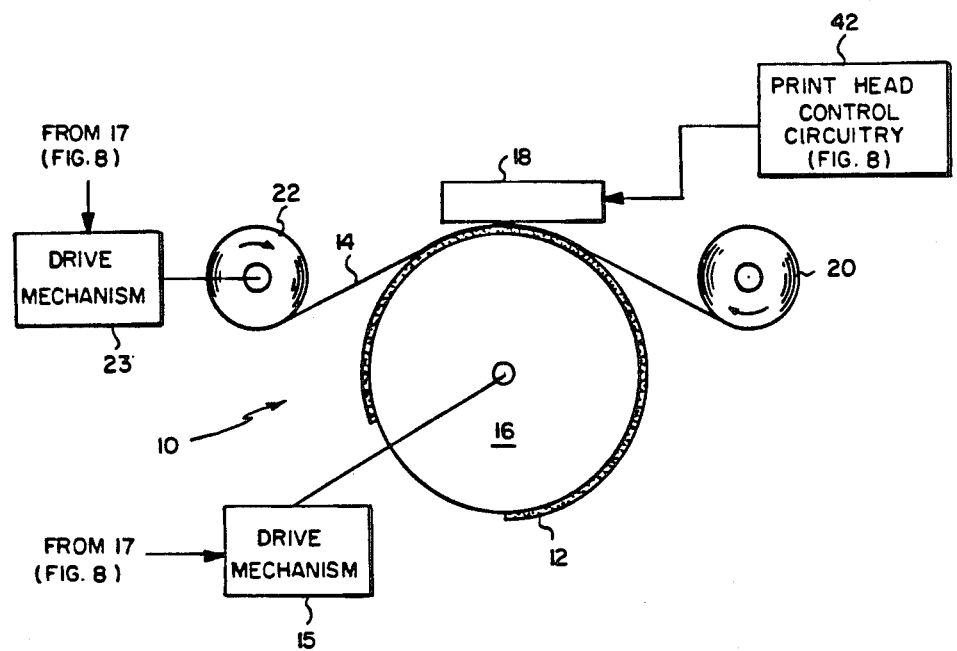
FIG. 2 is a schematic of a thermal printer apparatus which can be employed to make dye image pixels in accordance with the invention.

Referring now to FIG. 2, there is shown in schematic form a printer apparatus 10 which is adapted to print color images on a receiver member 12 from dyes transferred from a carrier member 14. The receiver member 12, in the form of a sheet is secured to a rotatable drum 16 which is mechanically coupled to a drive mechanism 15. It will be understood that the drive mechanism 15 continuously advances the drum 16 and receiver sheet 12 past a stationary thermal print head 18 during a cycle for addressing the heating elements of the print head. The print head 18 has a plurality of heating elements (see FIG. 4) which press the carrier member 14 against the receiver sheet. The carrier member 14 is shown in the form of a web and is driven from a supply roller 20 onto a take-up roller 22 by a drive mechanism 23 coupled to the take-up roller 22. The drive mechanisms 15 and 23 each include motors which continuously advance the carrier and the receiver relative to the heating elements of the print head 18. During printing while the heating elements are being energized, these members are moved such that the resultant dye image pixel will be somewhat larger than if they were stationary during dye transfer. The movement of the carrier is necessary to reduce sticking of the carrier to the heating elements in the print head. As will be clear to those skilled in the art, the motors in the mechanisms 15 and 23 can be continuous DC motors.

Figure 3:
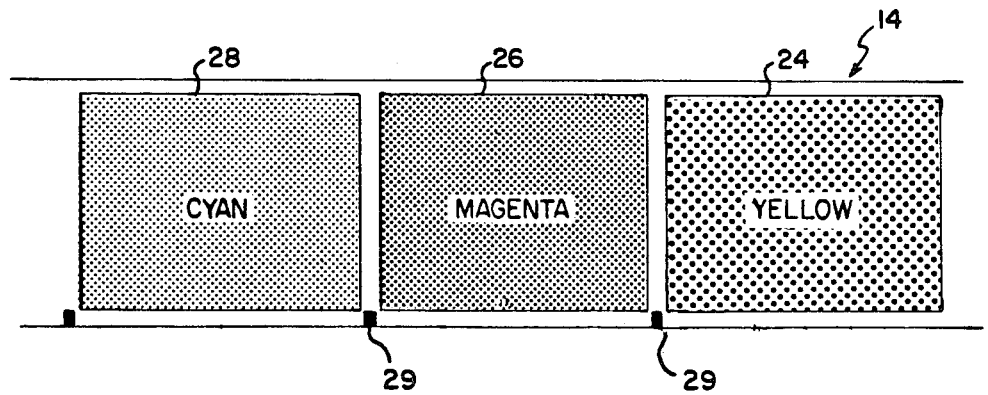
FIG. 3 is a top view of a carrier for use in the thermal printer apparatus of FIG. 2.

In FIG. 3, the carrier member 14 in the form of a web is shown formed with a repeated sequence of respective sections, or frames, of thermally transferable dye. Each frame in a sequence has a different color heat transferable dye. For example, each sequence of frames may include a frame of yellow thermally transferable dye 24, followed by a frame of magenta thermally transferable dye 26, followed by a frame of cyan thermally transferable dye 28. This sequence of yellow, magenta and cyan frames is repeated. In the preferred embodiment, the dye is a material which transfers from a carrier to a receiver in response to energy applied thereto by the individual heating elements of the print head 18. The dyes are transferred to the receiver sheet 12. Reference marks 29 can be used in the well known manner in the control of the operation of the drive mechanism 23.

Figure 6:
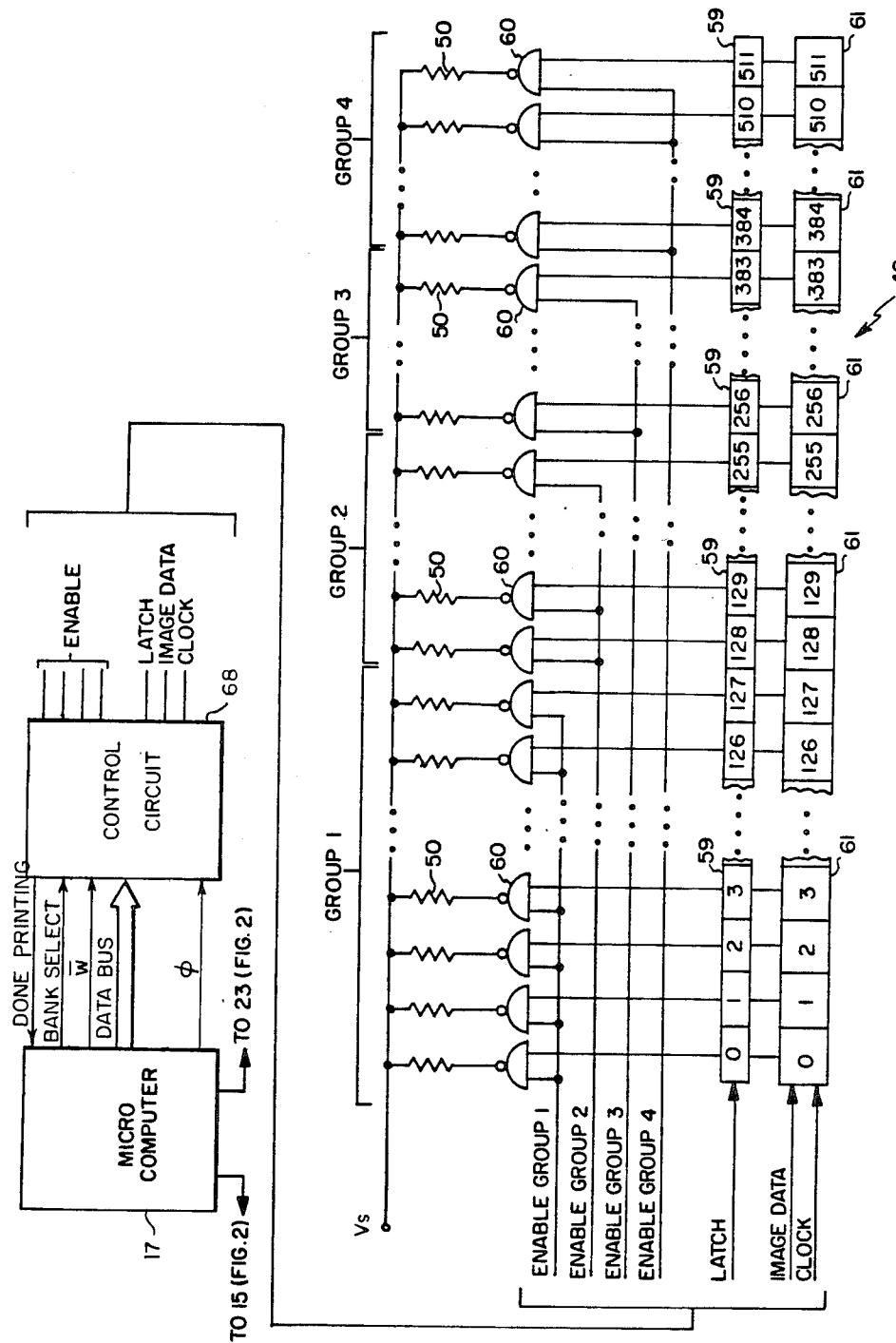
FIG. 6 is a schematic of the control system for operating the heating elements in the print head.

With reference to FIG. 2, the operation of apparatus 10 will be briefly described. Drive signals are continuously provided to the drive mechanism 15 from a microcomputer 17 (see FIG. 6) to rotate the drum 16 to bring successive, contiguous areas of the receiver sheet 12 into the print region opposite print head 18. A portion of a dye frame of carrier member 14 is disposed between the print head 18 and the receiver sheet 12. As noted above, these members are moved relative to the print head during the print operation. As shown in FIG. 6, the microcomputer 17 provides a bank select signal, write signal (W) and a clock signal $\phi$ to control circuit 68. It also provides an eight bit data signal representing the dye density of an image pixel. In response to signals provided by control circuit 68, energizing signals are supplied to heating elements of the print head 18 by print head control circuitry 48 heating the heating elements and causing dye to transfer from the carrier member 14 to the receiver 12. A "done printing" line from circuit 68 tells the microcomputer 17 when a line of image pixels has been printed.

As the receiver member 12 moves through the print region, the selective energization of heating elements of a group results in the printing of a color image on the receiver. The color of this image is determined by the color of the thermally transferable dye contained in each frame of the carrier member 14 that is driven past the print region. After one complete color frame of the image has been printed, receiver 12 is returned to an initial, or "home" position. Carrier member 14 is advanced to move another color frame into position for printing, and print head 18 is selectively energized so as to print the next color frame of the image superimposed onto the first printed image.

Figure 7:
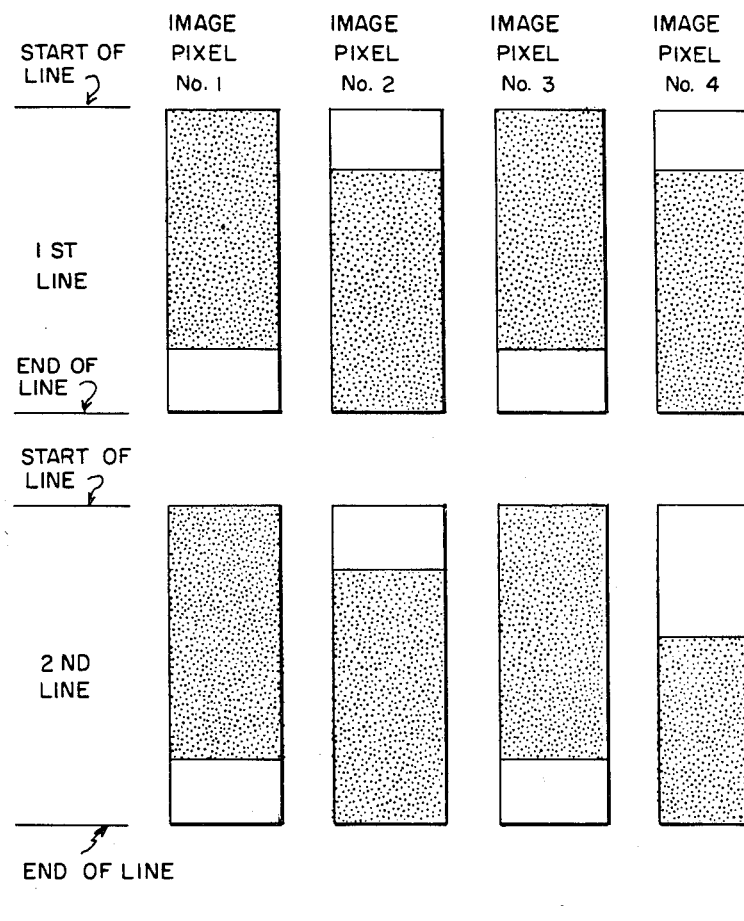
FIG. 7 illustrates a partial view of a pattern of dye image pixels of one color frame in a receiver in accordance with the invention.

At this point it is advantageous to refer to FIG. 7. As shown, only four image pixels of two lines of a color frame are shown. The dye portion of each image pixel is shown in black. Image pixel #1 has its dye portion in the top of the pixel while adjacent image pixel #2 has its dye portion in the bottom of the pixel. This alternating or staggered pattern is continued forming a "checkerboard" pattern. This pattern improves image quality. It also reduces the peak current demands of the heating elements of a group on average. It does this by equalizing the current demands of the heating element of a group over an entire address cycle. Clearly, other patterns will suggest themselves to those skilled in the art. Such patterns will include some adjacent image pixels with staggered dye portions. As will also be clear to those skilled in the art, the undyed portions (shown in white) of an image pixel also may be dyed. This is because a heated heating element cannot instantaneously lose its heat. When the term "dye portion" is referred to in this specification and claims, it will be understood to mean that area of a heating element which receives dye during that part of an address cycle when its corresponding heating element is being energized.

Figure 4:
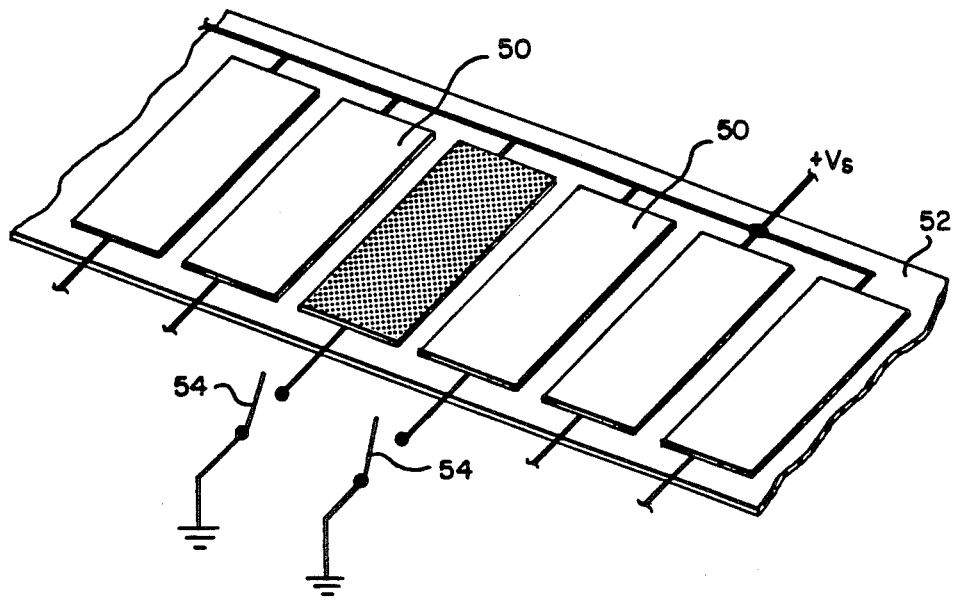
FIG. 4 is a perspective of several heating elements used in the print head of the apparatus of FIG. 2.

FIG. 4 shows in schematic several heating elements 50 disposed in a line. Each heating element 50 is made of a thin film of a resistive material, which is mounted on a non-conductive support 52. When a switch 54 is closed, current flows through the heating element. Although thin film heating elements are shown, it will be understood that thick film heating elements can also be used.

FIG. 6 illustrates in more detail the control circuit 48 by which print head 18 is selectively energized to print the respective, superimposed color frames of an image on a receiver 12. The print head assembly is energized in response to color signals. These signals are stored as color digital images in the memory of microcomputer 17. Digital images can also be directly transmitted to control circuit 68 over a channel from a distant image source.

As a numerical example, the print head assembly can be formed of 512 individual heating elements 50. One line at a time is printed. If each printed line corresponds to a column in a digital image, then one heating element is used for each horizontal line of the image to be printed. Each heating element 50 is shown as a resistor. Each heating element prints a plurality of image pixels. The first 128 heating elements (0–127) are assigned to Group 1. The next 128 heating elements (128–255) are assigned to Group 2. Groups 3 and 4 are each assigned 128 heating elements. Each heating element is electrically connected to a constant voltage power supply (shown as $V_s$) and a NAND gate 60. When both inputs to a NAND gate 60 are high, the output of the NAND gate 60 is connected to ground and a current pulse is generated. One input to each NAND gate is from a group enable signal and the other input is from a stage of a series of flip-flop latches 59 which contains 512 stages, one for each NAND gate. The latches are connected in parallel to the 512 stages of a shift register 61.

Figure 5:
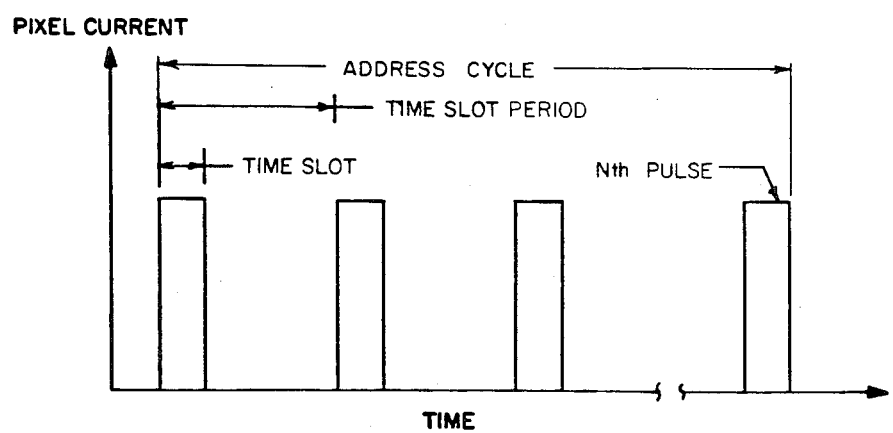
FIG. 5 illustrates the current pulses used to drive a heating element in accordance with the invention.

FIG. 5 shows the current pulses applied to a single heating element 50. A time slot is that time period when a group enable pulse signal is on. The number of times a group enable pulse signal is on is the predetermined number "N". Accordingly, there are at least N time slots in an address cycle for a group. After all the groups have been addressed one time, the above process is repeated N−1 times for each group and the address cycle for each group is over. After data are latched in the latches 59, a new line of data are entered into the 512 shift register stages. This process of entering data in the shift register can take place while heating elements are being energized. As shown in FIG. 5, the "ON" time of a heating element is proportional to the number of time slots of an address cycle during which a heating element is energized divided by the total number of time slots (N) in an address cycle of a group. As shown in FIG. 7, adjacent heating elements are energized in different time sequences such that their dye portions are staggered to form this checker-board pattern. The dye portion area of a heating element is proportional to the image pixel density. It is related to the number of time slots in which its corresponding heating element was energized.

In operation, interface 68 under the control of the microcomputer 17 provides clock signals to the shift register 61. See FIG. 6. At the same time a binary image data signal is clocked into the stages of the shift register 61 until all 512 stages either contain a high "1" or a low "0" signal level or state. Thus, for example, when an image pixel is to have a dye portion in its top portion, the binary number "1" is clocked into its stage at the beginning of an address cycle (start of line) for the number of time slots needed to obtain the desired dye density. A latch signal causes the data in each of the shift register stages to be entered into the corresponding stages of the latches 59. A high signal held on the output of its latch stage is connected to its corresponding NAND gate 60 for one time slot. The heating elements of each group are simultaneously addressed (the group enable signal is high) in parallel N different times for each group address cycle. Each group is addressed in sequence. So after the group 1 enable signal is turned low, only group enable signal 2 is turned high (the others are still low). There are four groups, and they are addresssed in sequence. When each group has been addressed one time, all the 512 heating elements 50 of the print head may have been energized one time depending on the state of their corresponding latch stages. Now let us assume there are 64 possible dye density levels. The shift register 61 will have to be loaded with data 64 different times. Each group of heating elements will be addressed 64 times. For an address cycle for a group, each heating element will be selectively energized during 64 time slots depending upon the desired pixel dye density. For the pattern shown in FIG. 7, adjacent heating elements will be energized in different sequences of time slots to provide the desired checker-board pattern. The microcomputer 17 sends eight bit words representing the dye intensity level of an image pixel to the control circuit 68.

Figure 8:
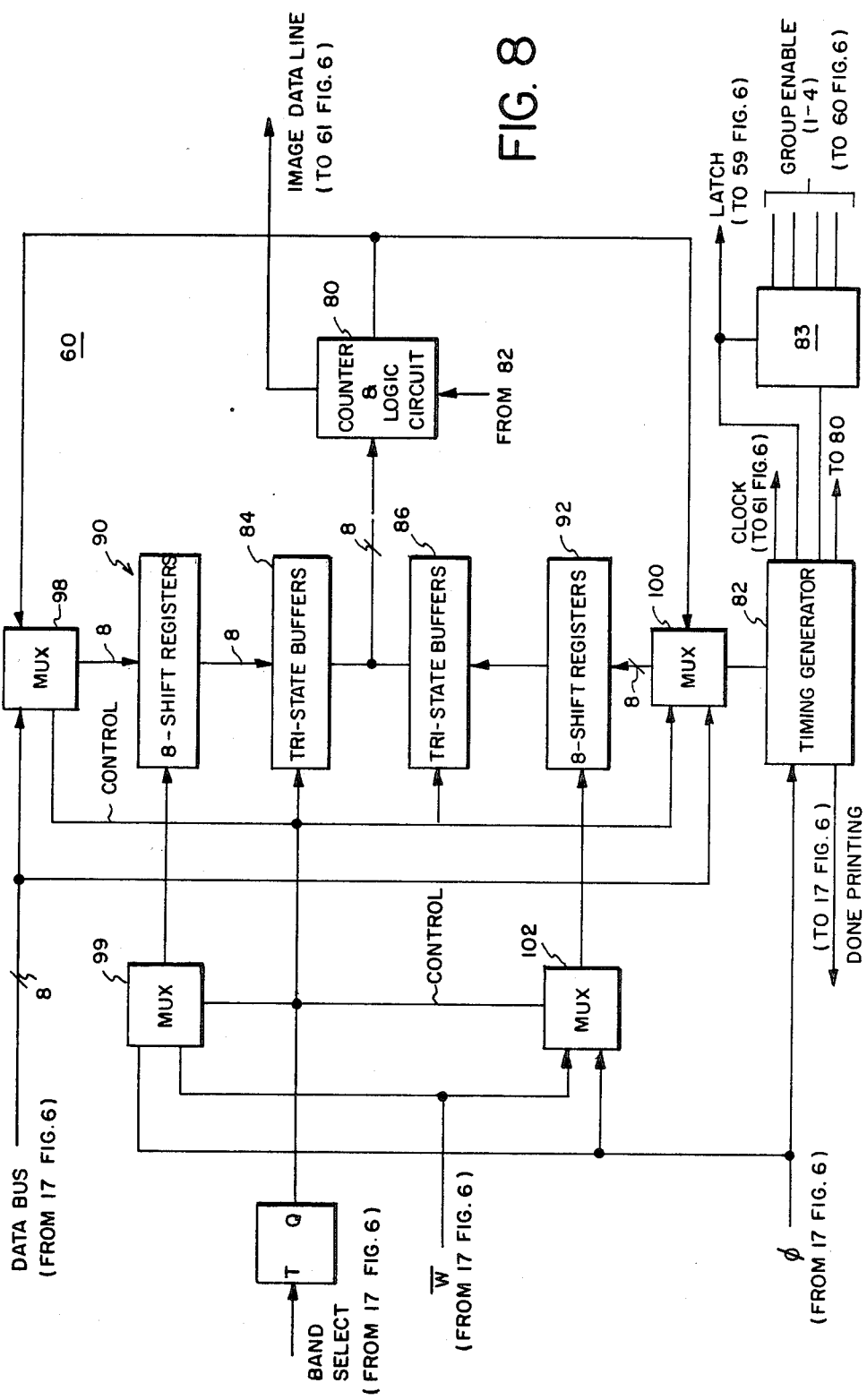
FIG. 8 is a schematic view of the control circuit 68 shown in FIG. 6.

Turning now to FIG. 8, control circuit 68 is shown in detail. Counter and logic circuit 80 provides a stream of serial bits (image data) to the shift register 61. We will continue with our example where there are 64 possible dye density levels for each dye image pixel. Counter and logic circuit 80 includes an eight bit counter. During the printing of a line, there will be 64 latch signals provided by a timing generator 82. Timing generator 82 also provides the clock signals to the shift register 61. It also provides signals to logic 83 which in turn provides the group enable signals. At the start of an address cycle, the counter and logic circuit 80 in response to a signal from timing generator 82, enters an eight bit word at the output of tri-state buffer 84 or tri-state buffer 86 into the counter of the circuit 80. The eight bit word represents the dye intensity level of an image pixel and also the position where the dye portion in an image pixel is to be located. the binary word represents a decimal number from 0–255. The counter in circuit 80 is a wrap-around counter which can hold a decimal count from 0–255. A heating element will be turned on which the most significant bit of this counter is 0. The number 1 is added to the number entered. More specifically, if the new number in the counter is between (0–127), logic in the circuit raises the image data line to a high level and the binary number "1" is entered into the shift register 61. If the new number is between (128–255), then the image data line will be low and the binary number zero is entered into the shift register 61. The new number is then transferred back to one of two banks of shift registers 90 or 92. After it is again entered into the counter of the logic circuit 80 and the number "one" added to it, the next image data line bit for this image pixel is entered into the shift register 61. This bit depending on whether it is a "1" or "0" will determine if during the next time slot the heating element is to be energized.

For each image pixel, this process will take place 64 times. If for example 15 time slots are to be energized to form a dye portion at the top of an image pixel (see pixel #1, FIG. 7) then a binary number represents the decimal number (128-15) or 113 is initially entered into the counter of logic 80. If a dye portion is to be formed at the bottom of the image pixel, then the number 256-(64-15) or 207 is initially entered into the counter of circuit 80.

Generalizing, we have the following relationships which are performed in the microcomputer 17.

$$S = 2^{N-1} - T \quad (1)$$

$$A = 2^N - (M - T) \quad (2)$$

where
N = number of bits to be entered into the counter of circuit 80;
M = number of modulation steps;
T = number of steps during which a heating element is active;
S = counter start data for dye portion in top of image pixel; and
A = counter start data for dye portion in bottom of image pixel.

The following is a discussion of how data are entered into the shift registers of banks 90 and 92. A bank select pulse signal from microcomputer 17 to the toggle input (T) of a flip/flop 96 causes the flip/flop to change state and make its output Q go high. A digital multiplier (MUX) 98, in response to this high Q signal transmits the eight bits from the data bus as an input to eight shift registers of bank 90. A high Q signal also causes MUX 99 to pass signal $\overline{W}$ to bank 90. A rising edge of $\overline{W}$ triggers eight separate shift registers in bank 90, which enters a single bit from each data word into the first stage of each shift register. All the data in the stages of the shift registers of bank 90 shift one stage to the right in each shift register.

Before the next rising edge of $\overline{W}$, a new data word will be impressed on the data bus. The tri-state buffer 84, when its control line is high (Q is high) causes the buffers 84 to be effectively decoupled from circuit 80. In other words the buffers 84 have no influence on the signal input to the circuit 80. At this time, high input control signal Q to buffers 86 causes the eight bits from the last stage of shift registers of bank 92 to appear as an input to circuit 80. Circuit 92 provides the binary image data signal and eight bits of data (+1 having been added to it) as an input to a MUX 100. A high level signal Q causes MUX 100 to present the eight bit output from the circuit 80 as an input to the shift registers 92. Also, a high Q causes the MUX 102 to deliver the clock signals $\phi$ to the shift registers 92. The frequency of $\phi$ is 64 times the frequency $\overline{W}$. Thus when 512 data words are entered into the shift registers of bank 90, each of the data words in the register bank 92 will have been circulated 64 times. Accordingly, the appropriate amount of data for each heating element to form an image pixel will have been transferred to the shift register 61. After a line is printed, the timing generator 82 will provide the "done printing" signal to the microcomputer 17. In response to this signal the microcomputer 17 provides a new bank select pulse signal to flip/flop 96. The output Q of the flip/flop 96 goes low. This causes data words to be entered into shift registers of bank 92 at a rate controlled by signal $\overline{W}$ and data words to circulate between shift registers of bank 90 and circuit 82 at the rate or frequency of the signal $\phi$. This rate is, of course, 64 times the rate of $\overline{W}$. The operation of printing this line is similar to that described above. This process is repeated until all the lines of the digital image have been printed.

I claim:

1. Thermal printing apparatus which transfers sublimable dye to form a dye image in a receiver composed of a plurality of lines of dye image pixels, each dye image pixel having N different possible dye density levels with the area of the dye portion of an image pixel being proportional to image pixel density, comprising:
   (a) a thermal print head for printing a line of image pixels and including a plurality of groups of heating elements, the heating elements of each group being simultaneously addressable in parallel during at least N time slots which comprise an address cycle;
   (b) a carrier including at least one heat transferable sublimable dye and being positionable in relation to the heating elements such that the amount of dye transferred for each image pixel is proportional to the energy provided by an energized heating element;
   (c) a receiver disposed in relation to the carrier sheet and the print head for receiving transferred dye to form dye image pixels;
   (d) means for moving the carrier and receiver relative to the print head; and
   (e) control means for energizing adjacent heating elements during different sequences of time slots of an address cycle to cause adjacent image pixels to be formed in which their dye portions are staggered to form a check-board pattern.

* * * * *